United States Patent [19]
Nishida

[11] Patent Number: 6,028,653
[45] Date of Patent: Feb. 22, 2000

[54] ACTIVE MATRIX LIQUID CRYSTAL DISPLAY PANEL HAVING AN IMPROVED NUMERICAL APERTURE AND DISPLAY RELIABILITY AND WIRING DESIGNING METHOD THEREFOR

[75] Inventor: Shinichi Nishida, Tokyo, Japan

[73] Assignee: NEC Corporation, Tokyo, Japan

[21] Appl. No.: 08/878,533

[22] Filed: Jun. 19, 1997

[30] Foreign Application Priority Data

Jun. 21, 1996 [JP] Japan .................................. 8-161742

[51] Int. Cl.⁷ .......................... G02F 1/1343; G02F 1/136
[52] U.S. Cl. ............................. 349/141; 349/42; 349/46; 349/139
[58] Field of Search ............................. 349/46, 42, 141, 349/139

[56] References Cited

U.S. PATENT DOCUMENTS

| | | | |
|---|---|---|---|
| 5,233,449 | 8/1993 | Shioji et al. | 359/68 |
| 5,598,285 | 1/1997 | Kondo et al. | 349/141 |
| 5,668,650 | 9/1997 | Mori et al. | 349/139 |
| 5,672,888 | 9/1997 | Nakamura | 349/149 |
| 5,694,185 | 12/1997 | Oh | 349/46 |
| 5,694,188 | 12/1997 | Sano et al. | 349/139 |
| 5,754,266 | 5/1998 | Ohta et al. | 349/139 |

FOREIGN PATENT DOCUMENTS

| | | |
|---|---|---|
| 7036058 | 2/1995 | Japan . |
| 7128683 | 5/1995 | Japan . |
| 7209662 | 8/1995 | Japan . |

OTHER PUBLICATIONS

M. Ohta et al., "s30–2 Development of Super–TFT–LCDs with In–Plane Switching Display Mode", *ASIA Display '95*, pp. 707–710.

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

A liquid crystal display panel of a high numerical aperture wherein, even if a scanning line or a signal line is provided close to an opposing electrode bus line, no short-circuiting occurs between electrodes of them is disclosed. A liquid crystal layer is held between a transparent insulating substrate and an opposing substrate, and a plurality of scanning lines and signal lines are provided on the transparent insulating substrate such that they intersect each other to partition a main surface into gratings, in which thin film transistors provided in the proximity of intersecting points of the scanning lines and the signal lines, pixel electrodes connected to the thin film transistors and opposing electrodes provided in an opposing relationship to the pixel electrodes are arranged to form pixels such that a display is controlled by electric fields generated substantially in parallel to the liquid crystal layer by applying voltages between the electrodes. Bus lines for supplying potentials to the opposing electrodes are formed in a layer different from the layer or layers in which the scanning lines and the signal lines are formed, and are provided close to the scanning lines or the signal lines.

8 Claims, 6 Drawing Sheets

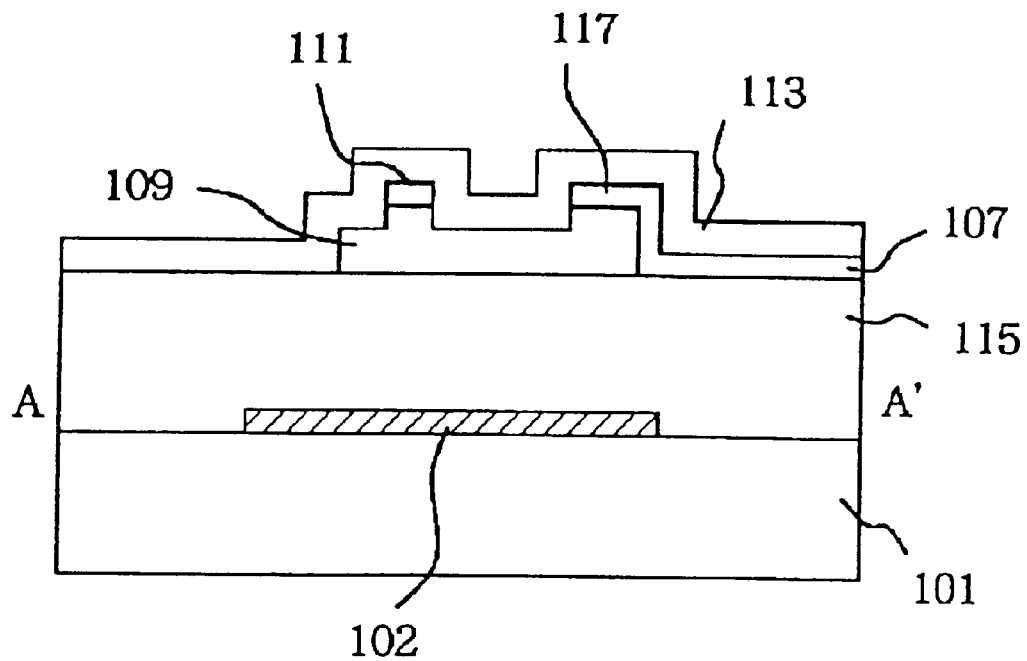
Fig.2 (a) (PRIOR ART)
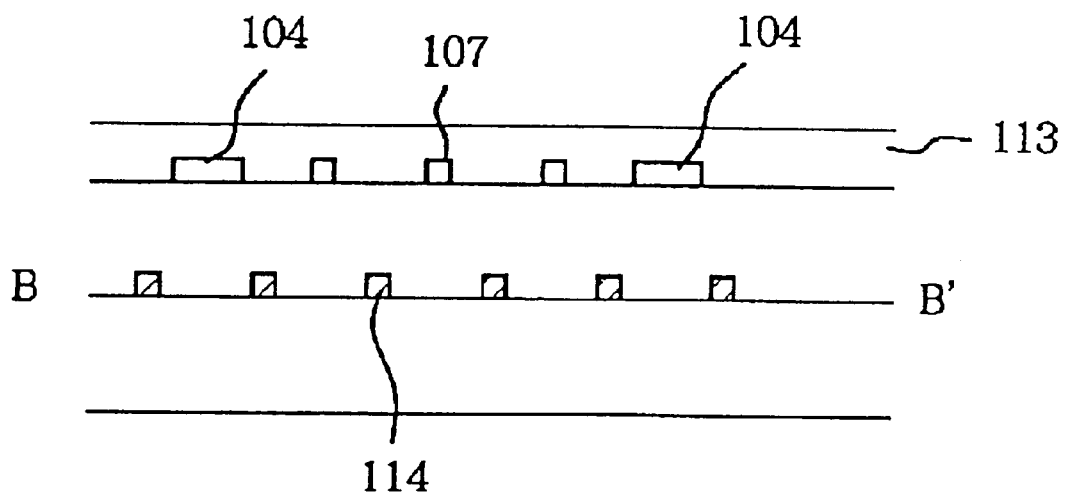
Fig.2 (b) (PRIOR ART)

ACTIVE MATRIX LIQUID CRYSTAL DISPLAY PANEL HAVING AN IMPROVED NUMERICAL APERTURE AND DISPLAY RELIABILITY AND WIRING DESIGNING METHOD THEREFOR

BACKGROUND OF THE INVENTION

1. Field of the Invention

This invention relates to an active matrix liquid crystal display panel of a structure wherein liquid crystal is held between a pair of transparent insulating substrates having thin film field effect transistors and electrodes thereon and also to a wiring designing method for the active matrix liquid crystal display panel.

2. Description of the Prior Art

An active matrix liquid crystal display panel (hereinafter referred to as AMLCD) wherein a thin film field effect transistor (hereinafter referred to as TFT) is used as a switching element for a pixel has a high picture quality and is applied widely to display devices for portable computers, light bulbs for projection type display devices and like devices.

Generally in an AMLCD, liquid crystal is held between a TFT substrate of a structure which includes scanning lines, signal lines and pixel electrodes connected to thin film transistors disposed in the proximity of intersecting points between the scanning lines and the signal lines and an opposing substrate, and controlled voltages are applied between pixel electrodes and opposing electrodes to control amounts of transmission light through corresponding pixels. The AMLCD is most characteristic in that the potentials between the electrodes between which the liquid crystal is held are easy to control comparing with those of a simple matrix type liquid crystal display device and a display of a high quality superior in contrast and angle of visibility is obtained.

In recent years, in order to further improve the visibility angle characteristic, a display method called in-plane switching mode has been proposed (refer to Asia Display '96). According to this method, a pixel electrode of a comb-like shape is formed on a TFT for each pixel, and an opposing electrode having a similar comb-like shape is formed in the same plane. When a voltage is applied between the electrodes, a parallel electric field is formed in the plane of the liquid crystal layer and varies the direction of a director of the liquid crystal thereby to control the light transmission amount.

In this mode, since the director acts only in a direction substantially parallel to the plane of the liquid crystal layer, such a problem that the director is diverted from the plane of the liquid crystal layer as in a TN mode so that the relationship between the light transmission amount and the applied voltage is very different depending upon whether the liquid crystal display device is viewed from the direction of the director or from the direction of a normal to the liquid crystal layer does not occur. Consequently, an image which is substantially uniform as viewed from a very wide visual angle can be obtained.

FIG. 1 is a plan view showing a construction of a pixel of a conventional active matrix liquid crystal display panel, and FIG. 2(a) is a sectional view taken along line A-A' of FIG. 1 while FIG. 2(b) is a sectional view taken along line B-B' of FIG. 1.

Referring to FIGS. 1, 2(a) and 2(b), a plurality of scanning lines 103 and a plurality of signal lines 104 intersect each other on a main surface of first transparent insulating substrate 101 formed from a glass substrate or a like substrate so that the main surface is partitioned into gratings. In each of the gratings, a set of active pixel elements including a pixel TFT disposed in the proximity of an intersecting point between scanning line 103 and signal line 104 and pixel electrode 107 driven by this pixel TFT is disposed.

Referring to FIG. 2(a), gate electrode 102 formed integrally with scanning line 103 is formed on first transparent insulating substrate 101, and a channel part made of island-shaped amorphous silicon 109 is provided on gate electrode 102 with gate insulating film 115 interposed therebetween. Drain electrode 111 formed integrally with signal line 104 and source electrode 117 formed integrally with pixel electrode 107 are provided on island-shaped amorphous silicon 109, and further, protective insulating film 113 is provided in such a manner as to cover over the entire pixel to construct a pixel TFT.

As shown in FIG. 2(b), pixel electrode 107 and signal line 104 are formed in a same layer, and opposing electrode 114 opposing to pixel electrode 107 is formed in another same layer as that in which scanning line 103 and gate electrode 102 are formed. Opposing electrode 114 is formed integrally with opposing electrode bus line 105 formed in parallel to scanning line 103 so that a potential may be supplied thereto from the bus line. Each of pixel electrode 107 and opposing electrode 114 is formed in a comb-like shape so that in-plane switching is realized by an electric field produced in parallel to the liquid crystal layer between the two electrodes.

Although the active matrix liquid crystal display panel described above is superior in that a good display having a very wide angle of visibility can be obtained due to the in-plane switching mode structure, it has the following problems.

In such a conventional structure wherein an opposing electrode bus line for applying a potential to an opposing electrode is formed in a same layer as that of a scanning line as described above with reference to FIG. 2, if it has an arrangement (close arrangement) wherein the opposing electrode bus line is arranged very closely to the scanning line, then short-circuiting may possibly occur between the scanning line and the opposing electrode bus line because of a defect in patterning of the scanning line and the opposing electrode bus line. Consequently, the opposing electrode bus line cannot be arranged closely to the scanning line, and the numerical aperture (ratio of the effective display area formed between a pixel electrode and an opposing electrode which occupies in a repeat pattern for one pixel) cannot have a high value.

Further, it likely occurs that stray light of back light enters the channel part, whereupon an impurity in the liquid crystal layer acts on the TFT to increase the off current of it, resulting in failure in display. Therefore, the display reliability is not high.

SUMMARY OF THE INVENTION

It is an object of the present invention to provide an active matrix liquid crystal display panel of a high numerical aperture and a high display reliability wherein the problems described above are solved and, even if a scanning line or a signal line is provided closely to an opposing electrode bus line, no short-circuiting occurs between the electrodes and also to provide a wiring designing method for the active matrix liquid crystal display panel.

In order to attain the object described above, according to an aspect of the present invention, there is provided an active matrix liquid crystal display panel wherein a liquid crystal layer is held between a first transparent insulating substrate and a second transparent insulating substrate provided in an opposing relationship to the first transparent insulating substrate and a plurality of scanning lines and a plurality of signal lines are provided on the first transparent insulating substrate in such a manner as to intersect each other to partition a main surface of the first transparent insulating substrate into gratings, in which thin film transistors individually provided in the proximity of intersecting points of the scanning lines and the signal lines, pixel electrodes individually connected to the thin film transistors and opposing electrodes individually provided in an opposing relationship to the pixel electrodes are arranged to form pixels such that a display is controlled by electric fields generated substantially in parallel to the liquid crystal layer by applying voltages between the pixel electrodes and the opposing electrodes, characterized in that bus lines for supplying the potentials to the opposing electrodes are formed in a layer different from a layer or layers in which the scanning lines and the signal lines are formed, and are provided closely to the scanning lines or the signal lines.

The active matrix liquid crystal display panel described above may be constructed such that gate electrodes of the thin film transistors are formed from first and second metal layers formed above and below a thin film semiconductor layer, which forms channel parts of the thin film transistors, with an insulating film interposed therebetween, and the first and second metal layers are formed in layers different from the layer of the signal lines and the first metal layer and the scanning lines are formed in a same layer while the second metal layer and the bus lines are formed in another same layer and the signal lines, source-drain electrodes of the thin film transistors and the pixel electrodes are formed in a further same layer.

Further, the active matrix liquid crystal display panel may be constructed such that the bus lines have overlaps with the signal lines which extend in the longitudinal direction of the signal lines.

According to another aspect of the present invention, there is provided a wiring designing method for an active matrix liquid crystal display panel wherein thin film transistors are provided in the proximity of intersecting points of scanning lines and signal lines which intersect each other and liquid crystal is held between pixel electrodes connected to the thin film transistors and opposing electrodes provided in an opposing relationship to the pixel electrodes and is driven through the thin film field effect transistors, comprising the step of forming bus lines for supplying potentials to the opposing electrodes in a layer different from a layer or layers in which the scanning lines and the signal lines are formed, the bus lines being provided closely to the scanning lines or the signal lines.

The wiring designing method for an active matrix liquid crystal display panel described above may further comprise the steps of forming first and second metal layers above and below a thin film semiconductor layer, which forms channel parts of the thin film transistors, with an insulating film interposed therebetween, the first and second metal layers being formed in layers different from a layer in which the signal lines are formed, the first metal layer being formed in a same layer as that of the scanning lines, the second metal layer being formed in a same layer as that of the the bus lines, and forming the signal lines, source-drain electrodes of the thin film transistors and the pixel electrodes in a same layer.

Further, the wiring designing method for an active matrix liquid crystal display panel may be constructed such that the bus lines are formed in such a manner as to have overlaps with the signal lines which extend in the longitudinal direction of the signal lines.

According to the present invention described above, since the scanning lines, the signal lines and the bus lines are formed in different layers from one another and can be arranged closely to one another, even if, for example, the bus lines are arranged closely to the signal lines, such short-circuiting as occurs in the prior art does not occur. Therefore, by disposing the scanning lines, the signal lines and the bus lines closely to one another, a high numerical aperture can be taken.

Where the gate electrodes of the thin film transistors are formed from the first and second metal layers formed above and below the thin film semiconductor layer, which forms the channel parts of the thin film transistors, with the insulating film interposed therebetween, stray light of back light is intercepted by the first and second metal layers. Consequently, such a situation that stray light enters the channel parts and causes a failure in display as occurs with the prior art does not occur.

Where the bus lines have overlaps with the signal lines which extend in the longitudinal direction of the signal lines, because the overlaps are formed, the capacitive coupling between the signal lines and the pixel electrodes is suppressed. Consequently, the pixel electrodes can be disposed closely to the signal lines, and accordingly, the numerical aperture can be further increased.

From the foregoing, according to the present invention, since the bus lines can be disposed closely to the scanning lines and the signal lines, there is an effect that an active matrix liquid crystal display panel having a high numerical aperture can be provided. Further, since stray light of back light is intercepted by the first and second metal layers and such a situation that stray light enters the channel parts and causes a failure in display as occurs with the prior art does not occur, there is another effect that the display reliability is improved.

Furthermore, where the bus lines have overlaps with the signal lines which extend in the longitudinal direction of the signal lines, since the pixel electrodes can be disposed closely to the signal lines, there is a further effect that the numerical aperture can be further increased.

BRIEF DESCRIPTION OF THE DRAWINGS

In the accompanying drawings:

FIG. 2(a) is a sectional view taken along line A-A' of FIG. 1 and FIG. 2(b) is a sectional view taken along line B-B' of FIG. 1;

DESCRIPTION OF THE PREFERRED EMBODIMENTS

Embodiments of the present invention are described below with reference to the drawings.

Figure 1:
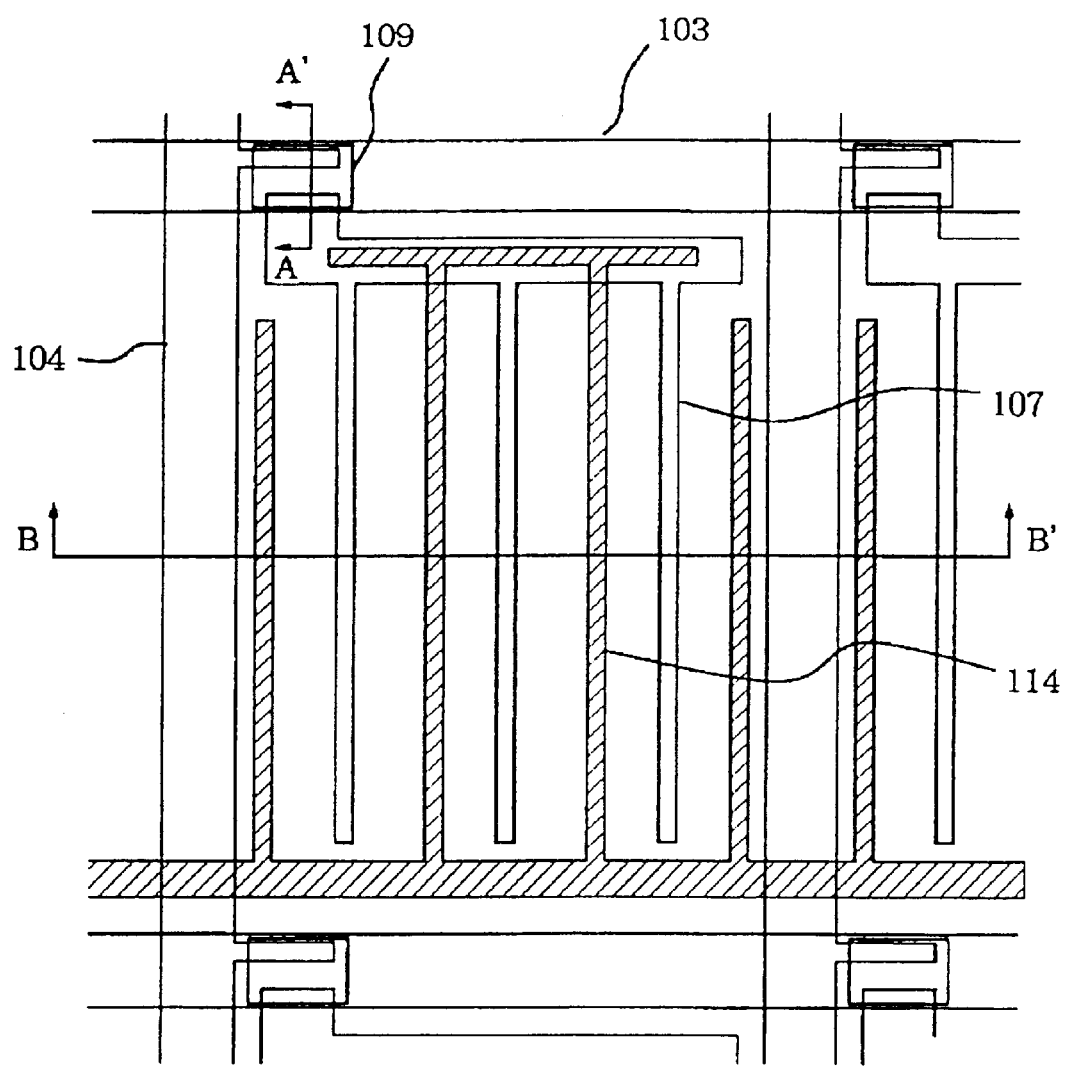
FIG. 1 is a plan view showing a construction of a pixel of a conventional active matrix liquid crystal display panel.
Figure 3:
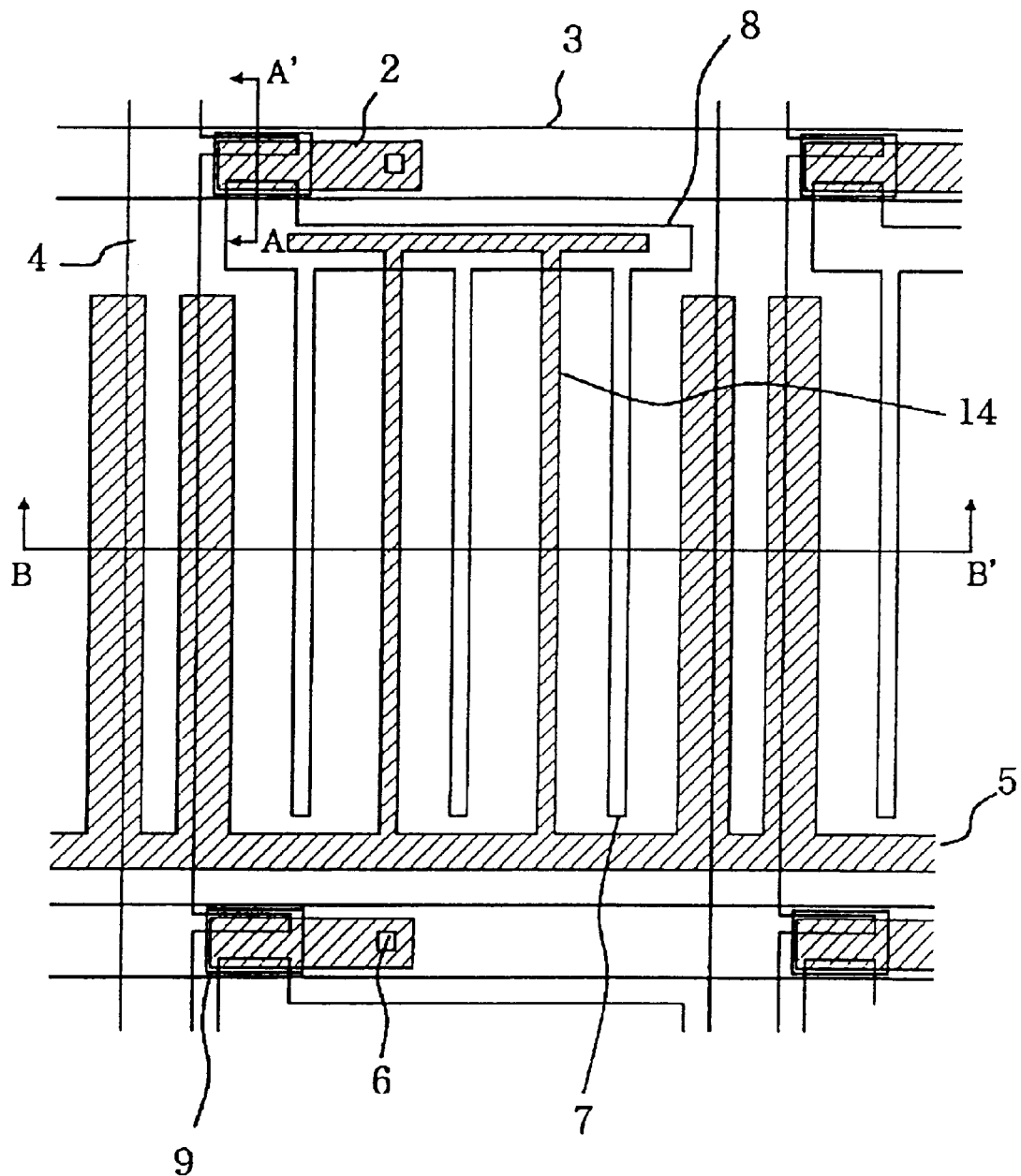
FIG. 3 is a plan view showing a construction of a pixel of an active matrix liquid crystal display panel of an embodiment of the present invention.
Figure 4:
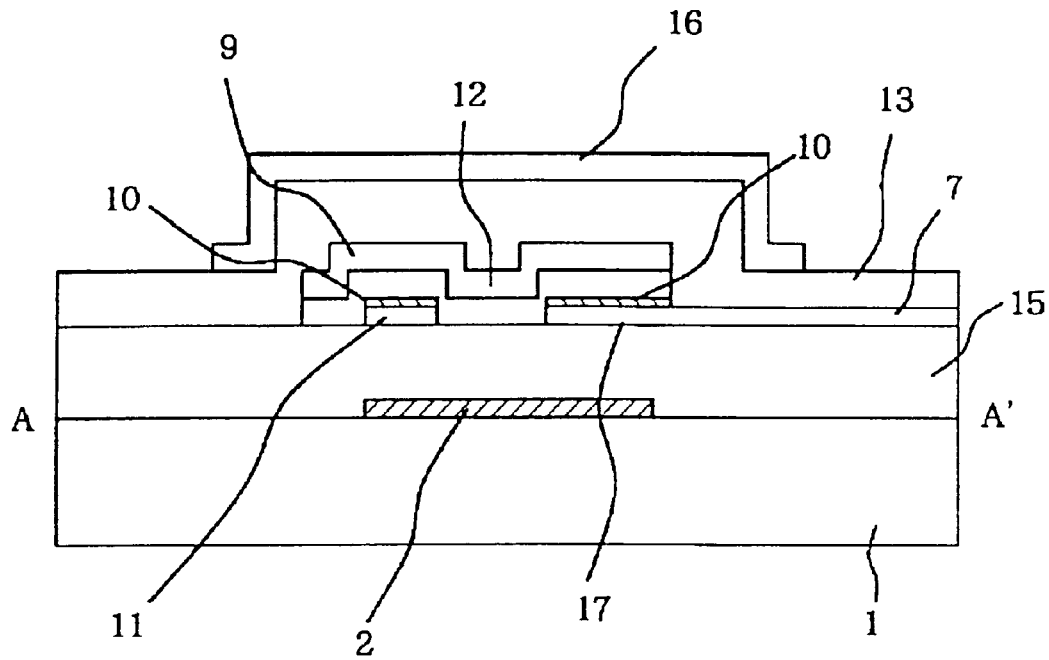
FIG. 4(a) is a sectional view taken along line A-A' of FIG. 3
FIG. 4(b) is a sectional view taken along line B-B' of FIG. 3.
Figure 4:
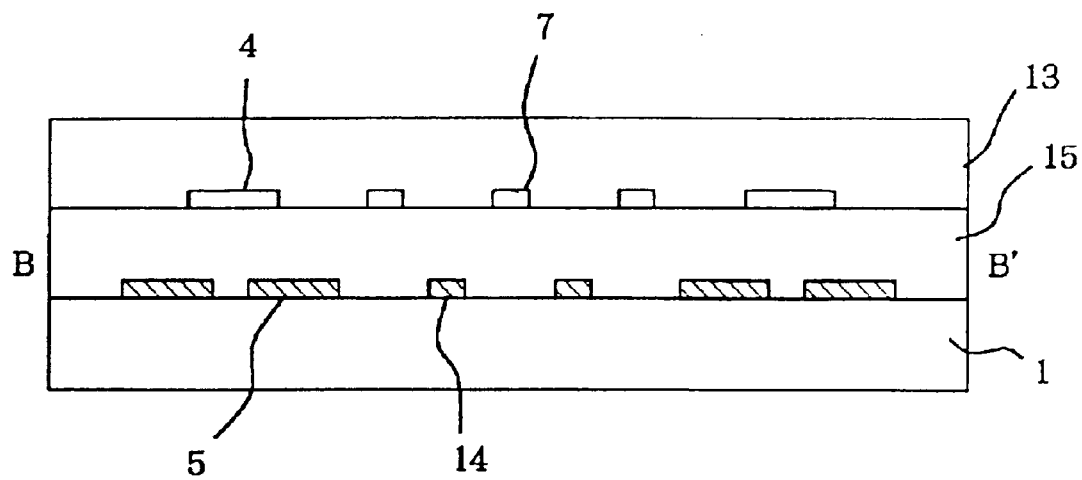

FIG. 3 is a plan view showing a construction of a pixel of an active matrix liquid crystal display panel of an embodiment of the present invention, and FIG. 4(a) is a sectional view taken along line A-A' of FIG. 3 and FIG. 4(b) is a sectional view taken along line B-B' of FIG. 3.

Referring to FIGS. 3, 4(a) and 4(b), a plurality of scanning lines 3 and a plurality of signal lines 4 intersect each other on a main surface of first transparent substrate 1 formed from a glass substrate or a like substrate such that the main surface is partitioned into gratings. In each of the gratings, a set of active pixel elements including a pixel TFT disposed in the proximity of an intersecting point of scanning line 3 and signal line 4 and pixel electrode 7 driven by the pixel TFT is disposed.

The pixel TFT is formed from lower side gate electrode 2, a channel part formed from island-shaped amorphous silicon 9 provided on lower side gate electrode 2 with third gate insulating film 15 interposed therebetween, first gate insulating film 12 formed integrally on the channel part, second gate insulating film 13 formed in such a manner as to cover over the entire pixel, upper side gate electrode 16 provided on second gate insulating film 13 and formed integrally with scanning line 3, drain electrode 11 formed integrally with signal line 4 between island-shaped amorphous silicon 9 and third gate insulating film 15, and source electrode 17 formed integrally with pixel electrode 7.

Lower side gate electrode 2 and scanning line 3 are electrically connected to each other via contact hole 6. Opposing electrode 14 is formed in the same layer as that of lower side gate electrode 2, and a potential is supplied thereto by opposing electrode bus line 5 formed in parallel to scanning line 3.

Each of pixel electrode 7 and opposing electrode 14 is formed in a comb-like shape so that an in-plane switch is realized by an electric field produced in parallel to the liquid crystal layer between them. Further, pixel electrode 7 and opposing electrode 14 partially form an overlap with each other with third gate insulating film 15 interposed therebetween, and storage capacitor 8 is formed from the overlap part (refer to FIGS. 3 and 4(b)). Further, opposing electrode 14 and signal line 4 have an overlap with each other along the longitudinal direction of the signal line (refer to FIGS. 3 and 4(b)). Because this overlap is formed, a capacitive coupling between signal line 4 and pixel electrode 7 is suppressed, and consequently, pixel electrode 7 can be formed closely to signal line 4.

Figure 5:
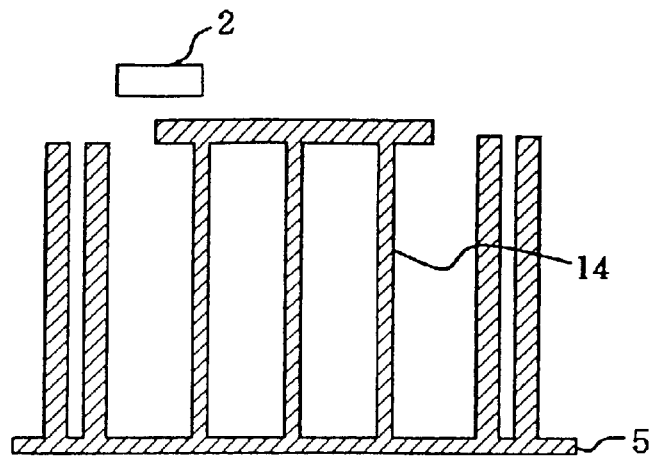
FIGS. 5(a) to 5(c) are plan views illustrating different steps of a process of production of the active matrix liquid crystal display panel shown in FIG. 3.
Figure 5:
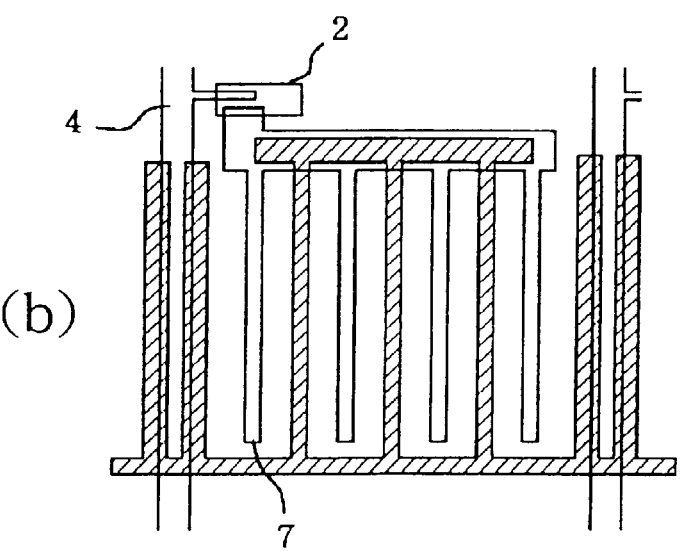
Figure 5:
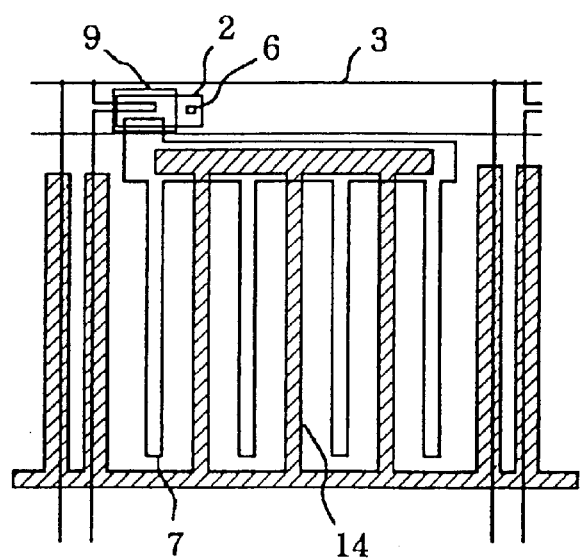

In the following, a process of production of the structure described above is described with reference to FIGS. 5(a) to 5(c). FIGS. 5(a) to 5(c) are plan views illustrating different steps of the process of production of the AMLCD described above.

First, a chromium film is deposited with the thickness of 150 nm on transparent insulating substrate 1 by a sputtering method, and the chromium film is patterned into shapes of lower side gate electrodes 2, opposing electrodes 14 and opposing electrode bus lines 5 to obtain a structure shown in FIG. 5(a).

After lower side gate electrodes 2, opposing electrodes 14 and opposing electrode bus lines 5 are formed, a silicon oxide film of 400 nm thick is deposited as third gate insulating film 15 over the overall area by an atmospheric pressure CVD method. On the silicon oxide film, a chromium film is deposited with the thickness of 150 nm by a sputtering method and an n-type amorphous silicon layer is deposited very thin by a plasma CVD method. Then, the chromium film and the n-type amorphous silicon layer are dry etched so that end faces thereof may have a tapered shape to pattern them into shapes of signal lines 4, pixel electrodes 7, drain electrodes 11 and source electrodes 17 to obtain a structure shown in FIG. 5(b).

After signal lines 4, pixel electrodes 7, drain electrodes 11 and source electrodes 17 are formed, an amorphous silicon film of 50 nm thick and an amorphous silicon nitride film, which is to form first gate insulating film 12, are successively deposited on them by a plasma CVD method, and the two films are patterned into island-like shapes of island-shaped amorphous silicon 9. In this instance, of the n-type amorphous silicon formed on signal lines 4 and source electrodes 17, drain electrode 11 and pixel electrodes 7 of the thin film transistors, those portions which do not form the patterns of island-shaped amorphous silicon 9 are removed simultaneously. Thereafter, a silicon nitride film of 300 nm thick is deposited as second gate insulating film 13. Here, after contact holes 6 are formed such that they extend through second gate insulating film 13 and third gate insulating film 15, a chromium layer of 150 nm thick is deposited by a sputtering method and is then patterned into shapes of scanning lines 3 and upper side gate electrodes 16 to obtain a structure shown in FIG. 5(c).

Although, in the process described above, an n-type amorphous silicon film is formed after a chromium film which is to form signal line 4 is formed and then the two films are patterned simultaneously, whereafter an amorphous silicon film and a silicon nitride film are formed, a similar structure can be obtained alternatively by patterning, after a chromium film is formed, the chromium film and performing, before an amorphous silicon film is formed by a plasma CVD method, plasma discharge in an atmosphere which contains $PH_3$ to selectively deposit phosphor on the chromium film.

Using first transparent substrate 1 on which a TFT array is formed in such a manner as described above, ordinary liquid crystal cell assembly is performed to obtain an active matrix liquid crystal display panel. With the active matrix liquid crystal display panel obtained in this manner, a TFT array of the dual gate structure which is high in performance and light-resisting property and is tough against an influence of an impurity in the liquid crystal can be formed by a comparatively small number of steps including 5 exposure operations. Besides, since scanning lines, signal lines and opposing electrode bus lines are formed from metal layers different from one another, line defects caused by short-circuiting between signal lines can be prevented and the yield in the production process is improved.

Figure 6:
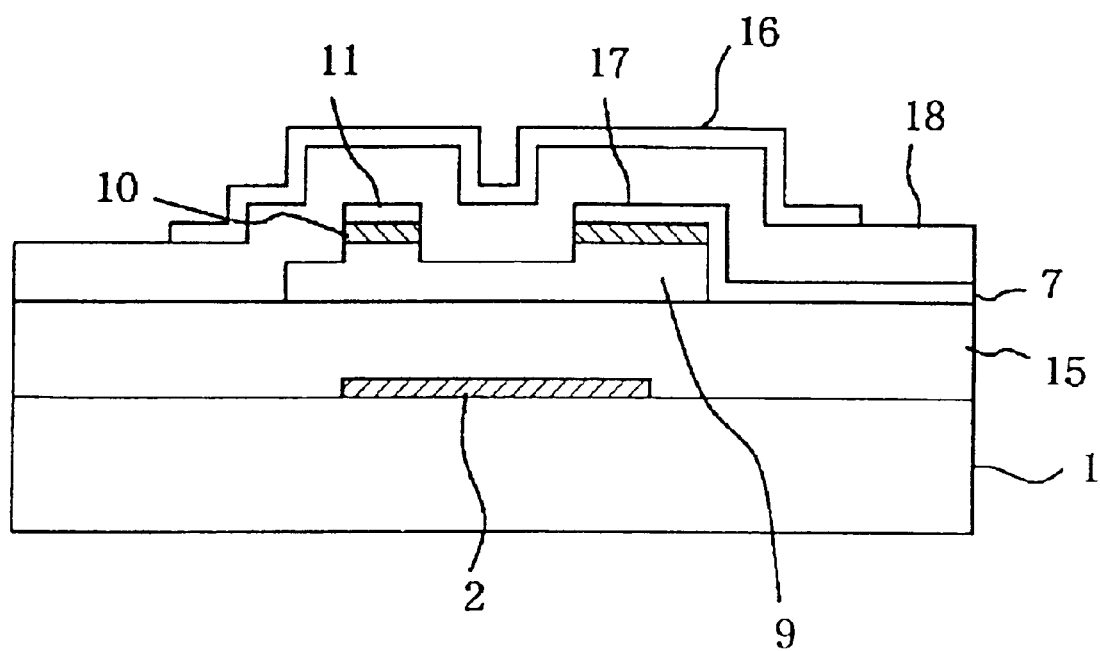
FIG. 6 is a sectional view taken along a TFT of another embodiment of the present invention.

It is to be noted that, while, in the present embodiment, drain electrodes 11 and source electrodes 17 are disposed on the lower side of island-shaped amorphous silicon 9, alternatively they may be disposed on the upper side of island-shaped amorphous silicon 9 as shown in FIG. 6.

In this instance, an amorphous silicon nitride film of 400 nm thick is first formed as third gate insulating film 15, and island-shaped amorphous silicon 9 and n-type amorphous silicon layer 10 are deposited successively, whereafter they are patterned into island-like shapes. Then, drain electrodes 11 and source electrodes 17 are formed in the same layer as that of signal lines 4, and a silicon nitride film of 300 nm thick is deposited as protective insulating film 18 on them. Then, contact holes are formed in them, and upper side gate electrodes 16 are formed integrally with scanning lines 3 on them.

While, in the foregoing description, lower side gate electrodes 2 are formed in the same layer as that of opposing electrodes 14 and opposing electrode bus lines 5 and upper side gate electrodes 16 and scanning lines 3 are formed in another layer, it is also possible to form lower side gate electrodes 2 and scanning lines 3 in the same layer and form upper side gate electrodes 16, opposing electrodes 14 and opposing electrode bus lines 5 in another layer.

What is claimed is:

1. An active matrix liquid crystal display panel comprising:
    a first transparent insulating substrate;
    a second transparent insulating substrate opposing said first transparent insulating substrate;
    a liquid crystal layer provided between said first and said second transparent insulating substrates;
    a scanning line and a signal line provided on said first transparent insulating substrate in such a manner as to partition a main surface of said first transparent insulating substrate into a grating;
    a thin film transistor provided in said grating;
    a pixel electrode connected to said thin film transistor said pixel electrode having a comb shape with teeth;
    an opposing electrode opposing said pixel electrode, said opposing electrode having a comb shape with teeth extending into the spaces between the teeth of said pixel electrode to form pixels such that a display is controlled by electric fields generated substantially in parallel to said liquid crystal layer by applying voltages between said pixel and said opposing electrodes;
    wherein a bus line for supplying the potentials to said opposing electrode is formed in a layer different from the layers in which said scanning lines and said signal lines are formed.

2. An active matrix liquid crystal display panel as claimed in claim 1, further comprising:
    a first metal layer and a second metal layer formed above and below, respectively, a channel part of said thin film transistor, thereby forming gate electrodes thereof;
    an insulating film interposed between each of said gate electrodes and said channel part of said thin film transistor;
    wherein (1) said first and second metal layers are formed in layers different from the layer in which said signal line is formed, (2) said first metal layer and said scanning line are formed in the same layer, (3) said second metal layer and said bus line are formed in the same layer, and (4) said signal line, a source electrode of said thin film transistor, a drain electrode of said thin film transistor, and said pixel electrodes are formed in the same layer.

3. A wiring designing method for an active matrix liquid crystal display panel, comprising the steps of:
    providing a thin film transistor in a grating defined by a scanning line and a signal line;
    connecting a pixel electrode having a comb shape to said thin film transistor;
    positioning an opposing electrode having a comb shape in an opposing relationship to said pixel electrode; and
    providing a bus line for supplying potentials to said opposing electrode in a layer which is different than a layer in which said scanning line and said signal line are formed.

4. A wiring designing method for an active matrix liquid crystal display panel as claimed in claim 3, further comprising the steps of:
    forming a first metal layer and a second metal layer above and below, respectively, a channel part of said thin film transistor; and
    interposing an insulating film between said first and said second metal layers and said channel part of said thin film transistor;
    wherein said first and said second metal layers are formed in layers different from the layer in which said signal line is formed;
    wherein said first metal layer is formed in the same layer in which said scanning line is formed;
    wherein said second metal layer is formed in the same layer in which said bus line is formed; and
    wherein said signal line, a source electrode of said thin film transistor, a drain electrode of said thin film transistor, and said pixel electrode are formed in the same layer.

5. An active matrix liquid crystal display panel comprising:
    a first transparent insulating substrate;
    a second transparent insulating substrate opposing said first transparent insulating substrate;
    a liquid crystal layer provided between said first and said second transparent insulating substrates;
    a scanning line and a signal line provided on said first transparent insulating substrate in such a manner as to partition a main surface of said first transparent insulating substrate into a grating;
    a thin film transistor provided in said grating;
    a pixel electrode connected to said thin film transistor, said pixel electrode having a comb shape with teeth;
    an opposing electrode opposing said pixel electrode, said opposing electrode having a comb shape with teeth extending into the spaces between the teeth of said pixel electrode to form pixels such that a display is controlled by electric fields generated substantially in parallel to said liquid crystal layer by applying voltages between said pixel and said opposing electrodes;
    wherein a bus line for supplying the potentials to said opposing electrode is formed in a layer different from the layers in which said scanning lines and said signal lines are formed; and
    wherein said bus line overlaps said signal line and extends in the longitudinal direction of said signal line.

6. An active matrix liquid crystal display panel as claimed in claim 5, further comprising:
    a first metal layer and a second metal layer formed above and below, respectively, a channel part of said thin film transistor, thereby forming gate electrodes thereof;
    an insulating film interposed between each of said gate electrodes and said channel part of said thin film transistor;
    wherein (1) said first and second metal layers are formed in layers different from the layer in which said signal line is formed, (2) said first metal layer and said scanning line are formed in the same layer, (3) said second metal layer and said bus line are formed in the same layer, and (4) said signal line, a source electrode of said thin film transistor, a drain electrode of said thin film transistor, and said pixel electrode are formed in the same layer.

7. A wiring designing method for an active matrix liquid crystal display panel, comprising the steps of:

providing a thin film transistor in a grating defined by a scanning line and a signal line;

connecting a pixel electrode having a comb shape to said thin film transistor;

positioning an opposing electrode having a comb shape in an opposing relationship to said pixel electrode; and providing a bus line for supplying potentials to said opposing electrode in a layer which is different than a layer in which said scanning line and said signal line are formed;

wherein said bus line is formed to overlap said signal line and to extend in the longitudinal direction of said signal line.

8. A wiring designing method for an active matrix liquid crystal display panel as claimed in claim 7, further comprising the steps of:

forming a first metal layer and a second metal layer above and below, respectively, a channel part of said thin film transistor; and interposing an insulating film between said first and said second metal layers and said channel part of said thin film transistor;

wherein said first and said second metal layers are formed in layers different from the layer in which said signal line is formed;

wherein said first metal layer is formed in the same layer in which said scanning line is formed;

wherein said second metal layer is formed in the same layer in which said bus line is formed; and wherein said signal line, a source electrode of said thin film transistor, a drain electrode of said thin film transistor, and said pixel electrode are formed in the same layer.

* * * * *